(12) United States Patent
Marchand

(10) Patent No.: US 6,547,140 B2
(45) Date of Patent: Apr. 15, 2003

(54) MICROWAVE BARCODE READER USING DIPOLE ANTENNA

(75) Inventor: J. F. Philippe Marchand, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 96 days.

(21) Appl. No.: 09/725,582

(22) Filed: Nov. 29, 2000

(65) Prior Publication Data

US 2002/0063156 A1 May 30, 2002

(51) Int. Cl.$^7$ ................................. G06K 7/10
(52) U.S. Cl. ..................... 235/462.01; 235/462.46; 235/494; 235/462.02
(58) Field of Search ................ 235/462.01, 462.12, 235/462.13, 450, 451, 494, 375

(56) References Cited

U.S. PATENT DOCUMENTS

| | | | |
|---|---|---|---|
| 4,008,477 A | | 2/1977 | Babij et al. |
| 5,059,951 A | * | 10/1991 | Kaltner ........................ 340/572 |
| 5,159,181 A | * | 10/1992 | Bartels et al. ............... 235/441 |
| 5,430,278 A | * | 7/1995 | Krieg et al. ................. 235/449 |
| 5,430,284 A | * | 7/1995 | Numazaki .............. 235/462.02 |
| 5,453,602 A | * | 9/1995 | Hanada ........................ 235/439 |
| 5,581,257 A | | 12/1996 | Greene et al. |
| 5,600,115 A | * | 2/1997 | Balzano ........................ 235/382 |
| 5,786,910 A | | 7/1998 | Walters et al. |
| 5,811,792 A | * | 9/1998 | Verschuur et al. .......... 250/223 |
| 5,979,758 A | | 11/1999 | Swartz et al. |
| 5,986,550 A | | 11/1999 | Rapaport et al. |
| 6,061,026 A | | 5/2000 | Ochi et al. |
| 6,202,929 B1 | * | 3/2001 | Verschuur et al. ..... 235/462.25 |
| 6,332,574 B1 | * | 12/2001 | Shigekusa et al. ..... 235/462.12 |
| 6,427,922 B1 | * | 8/2002 | Marchand ................... 235/494 |

OTHER PUBLICATIONS

Millimeter and Submillimeter Wave Spectroscopy of Solids (Springer Physics)—http://206.67.72.201/catalog/np/oct99np/3–540–62860–6.html.

* cited by examiner

*Primary Examiner*—Michael G. Lee
*Assistant Examiner*—Ahshik Kim
(74) *Attorney, Agent, or Firm*—Fay, Sharpe, Fagan, Minnich & McKee, LLP

(57) ABSTRACT

A microwave barcode system is provided wherein the barcode comprises a plurality of conductive wires, mounted on a surface, or embedded beneath the surface of the object. A transmitter, comprising a dipole antenna, radiates microwave signals in the direction of the surface, and a microwave reader, comprising a dipole antenna positioned to receive the microwave signals passing through the surface, senses an attenuation of the microwave signal caused by a resonant interaction between the microwave signals and the conductive wires. The conductive wires of the present invention can be mounted in a stand-up fashion, wherein each wire is mounted adjacent to and parallel to, but not touching, its at least one neighbor, or in a lay-down fashion, wherein each wire is mounted coincident with an imaginary line which is also coincident with the remaining wires, and wherein the wires are mounted end-to-end with a gap surrounding each wire end. Both stand-up and lay-down versions of the barcode may be employed simultaneously without interference between the two versions.

23 Claims, 4 Drawing Sheets

MICROWAVE BARCODE READER USING DIPOLE ANTENNA

BACKGROUND OF THE INVENTION

Barcodes have become a common and useful tool for identifying products, parts, prices, serial numbers, and many other bits of data. Over the years many different barcodes have been used, including the UPC codes found in grocery stores and the Code 39 barcodes used for many non-grocery items. These different barcodes are substantially only alternative ways of encoding information. For example, a narrow bar or space might represent a 0 while a wide bar or space might represent a 1, or a long bar might represent a 0 while a short bar might represent a 1.

Barcodes can differ on how they are sensed. Light, usually in the form of a scanning laser beam, or magnetic energy are commonly used to sense barcodes. A problem with light operated barcodes is that the barcode can become obscured, either with contaminates such as dirt or smudged ink, or by an opaque obstruction, such as a barcode-containing document being inside an envelope or under another document. Another manner of sensing barcodes is through magnetics. Magnetic barcodes generally require careful, close placement of a magnetic barcode reader relative to the barcode itself, which is often a difficult task.

Thus, barcodes sensed by light cannot be placed where they cannot be scanned by a scanning light beam. For example, they cannot be placed on objects within envelopes, and they cannot be embedded beneath the surface of an object such as paper currency. While it might be possible to accomplish this objective with magnetic barcodes, technical consideration make it a complex task.

Therefore, a barcode system that permits reading a barcode even when embedded beneath a surface, or placed within opaque materials such as an envelope, and not requiring highly accurate placement of the barcode reader relative to the barcode would be beneficial. Even more beneficial would be a barcode system which is of a small size and which permits for multiple barcodes at a single physical location.

SUMMARY OF THE INVENTION

The present invention is directed to a microwave barcode system wherein the barcode comprises a plurality of conductive wires, consisting of a plurality of lengths, mounted on a surface of an object, or embedded beneath the surface of the object. A transmitter, comprising a dipole antenna, radiates microwave signals in the direction of the surface. A microwave reader, comprising a dipole antenna, positioned to receive the microwave signals passing through the surface, and senses an attenuation of the microwave signal caused by a resonant interaction between the microwave signals and the conductive wires.

The conductive wires of the present invention can be mounted in a standup fashion, wherein each wire is mounted adjacent to and parallel to, but not touching, its at least one neighbor, and/or in a lay-down fashion, wherein each wire is mounted coincident with an imaginary line which is also coincident with the remaining wires, and wherein the wires are mounted end-to-end with a gap surrounding each wire end. Because a microwave reader positioned to read a stand-up barcode cannot detect signals polarized for a lay-down barcode, and a reader positioned to read a lay-down barcode cannot detect signals polarized for a stand-up barcode, both stand-up and lay-down versions of the barcode may be employed simultaneously at a single physical location.

DESCRIPTION OF THE DRAWINGS

The present invention exists in the construction, arrangement, in combination of the various parts of the device, and steps of the method, whereby the objects contemplated are attained as hereinafter more fully set forth, specifically pointed out in the claims, and illustrated in the accompanying drawings in which:

DETAILED DESCRIPTION OF THE PREFERRED EMBODIMENTS

A microwave barcode system has been disclosed in now abandoned U.S. Ser. No. 09/342,396, by Marchand, filed Jun. 29, 1999, entitled MICROWAVE BARCODE, hereby incorporated by reference.

Figure 1:
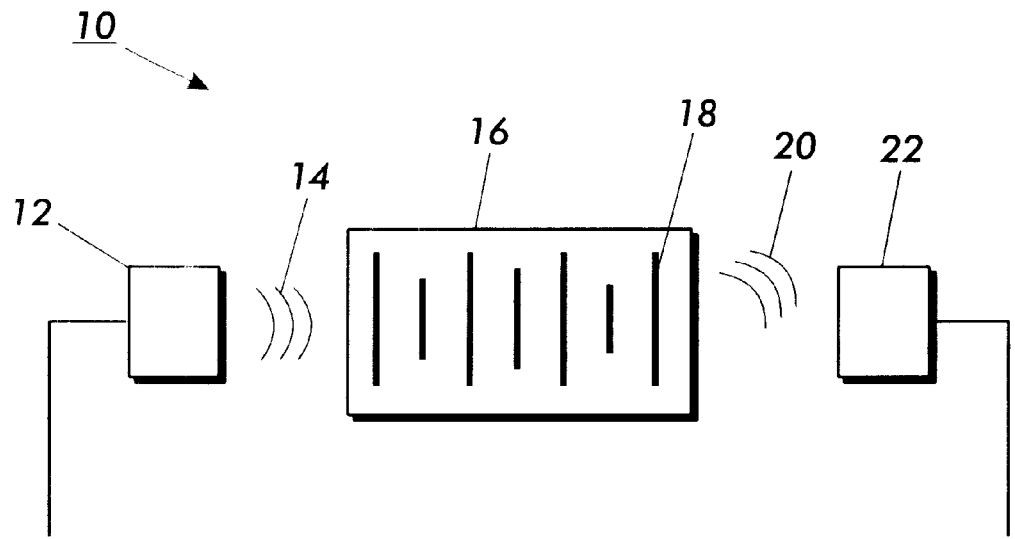
FIG. 1 depicts a block diagram of a microwave barcode system.

FIG. 1 sets forth a block diagram of a microwave barcode system 10. Such a system includes a microwave transmitter 12 which emits a polarized microwave signal 14 toward a substrate 16 having a set of conductive lines (wires) 18 which act as the microwave readable element or barcodes. When the microwave signal 14 strikes the microwave readable elements 18, the microwave signal is partially scattered and partially attenuated. The scattered portion 20 of the microwave signal can be sensed by a sensor 22. If the sensor 22 receives a scattered signal it determines that a microwave-readable element exists. In that case, sensor 22 produces a predetermined output signal, such as a one. Therefore, useable data is obtained through the use of the above-noted system. Wires 18 may be located on the surface, or below the surface of substrate 16.

To obtain transmission and reception of the microwave signal, appropriate receptors and receivers of the signal must be used. However, it had been considered that severely large receptors and transmitters would be necessary to transmit and receive the signals. A device which may be used as transmitters or receptors is a horn antenna and another is wave guides. While a level of success is obtained using these elements as transmitters and receivers, certain deficiencies existed such as bulkiness of the elements and the lack of spatial resolution in an obtained signal.

Figure 2:
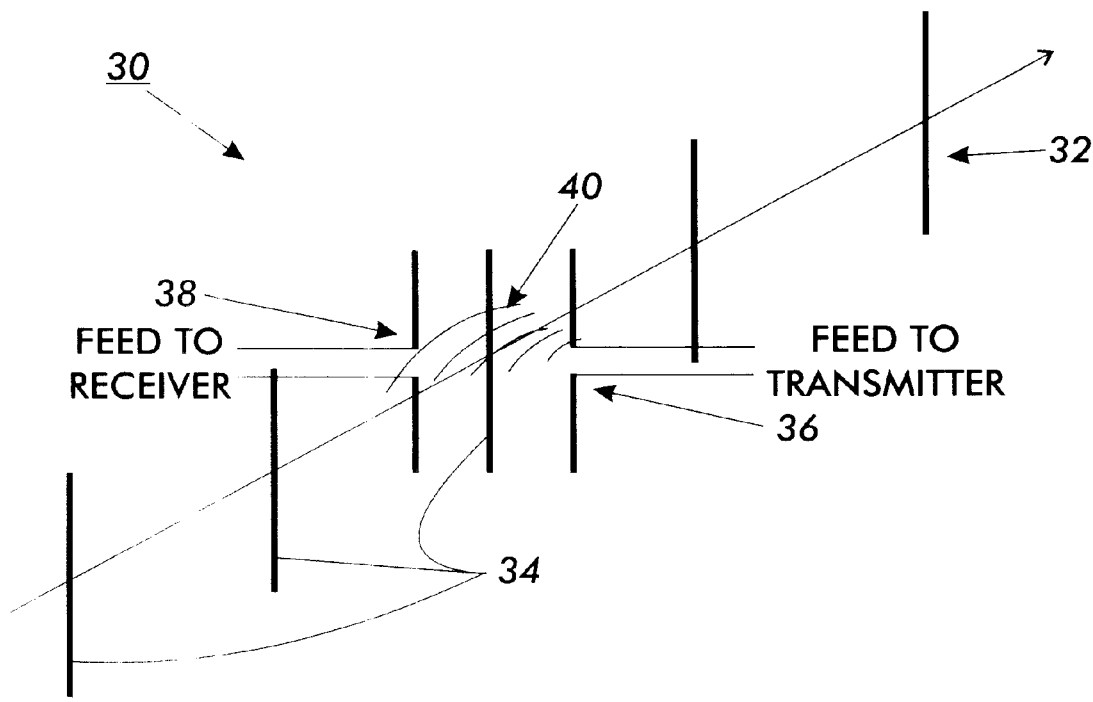
FIG. 2 illustrates a microwave barcode system, employing dipole antennas with barcode elements in a stand-up configuration.

Turning to FIG. 2, illustrated is a microwave barcode system 30 including a barcode 32 made up of a set of conductive lines (wires) 34, lined up on or below a surface, parallel to each other. In the stand-up barcode the wires are oriented parallel to each other and perpendicular to the direction of the barcode 32. The barcode 32 is read by sliding it between two dipole antennas, a transmitting dipole antenna 36 and a receiving dipole antenna 38, one on each side of the barcode 32. The wires 34 and antennas 36, 38 illustrated in FIG. 2 and other Figures are not drawn to scale. A presence and length of each wire 34 in barcode 32 can be determined by detecting absorption of microwaves 40 in the gap between the antennas 36, 38 as a function of the frequency of the microwaves 40 used.

Figure 3:
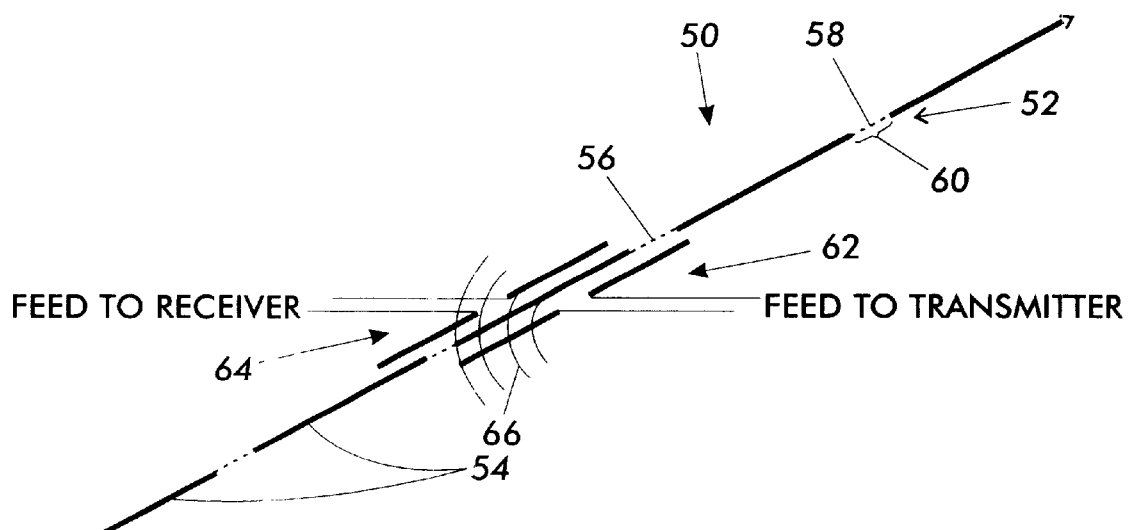
FIG. 3 illustrates a microwave barcode system, employing dipole antennas in a lay-down configuration.

With reference now to FIG. 3, a microwave barcode system 50 illustrates a lay-down microwave barcode 52 made up of a set of conductive lines (wires) 54, lined up end-to-end, coincident with a line 56 in the direction of the barcode 52. The wires 54 are arranged with a gap 58 between adjacent ends 60 so that there is no contact between any two wires 34. As with the stand-up barcode, the lay-down barcode 52 is read by sliding it between two antennas, a transmitting dipole antenna 62 and a receiving dipole antenna 64, one on each side of the barcode 52. A presence and length of each wire 54 in the barcode can be determined by detecting attenuation of microwaves 66, caused by a resonant interaction of the microwave signal with each wire 54, in the gap between the antennas 62, 64 as a function of the frequency of the microwaves 66 used. The lay-down microwave barcode has the advantage of using less "real estate" than the stand-up barcode.

Each of the wires 34, 54 in each barcode 32, 52 encode one or more bits of data, depending on how many lengths of wire are used. If, for example, 4 different lengths are used, each wire can encode 2 bits of data comprising a binary number. Four bits of data can also be encoded using only 3 different lengths of wire and the absence of a wire at each location. For example, using 3 different lengths of wire and the absence of a wire at each location, the absence of a wire could represent the binary value 00, the shortest length of wire could represent binary value 01, the median length of wire could represent binary value 10, and the longest length of wire could represent binary value 11. Alternately, each length of wire and the absence of a wire at each location could be used to represent letters of an alphabet.

Because of the small size and relative simplicity of the dipole antennas 36, 38, 62, 64, and because transmitting antennas 36, 62 produce polarized microwave signals, while the receiving antenna 38, 64 are sensitive to the polarization of the microwave signals, a combination of stand-up and lay-down barcodes are also possible. The lay-down detector cannot detect the stand-up barcode, and vice versa, the two kinds of barcodes 32, 52 can be placed at the same location. The two sets of antennas 36, 38, 62, 64 will then be used to read the two barcodes 32, 52. This concept is understandable by superposing FIGS. 2 and 3.

The use of dipoles for both the transmitter 36, 62 and receiver 38, 64 antennas has the advantage of compactness, simplicity and good performance. Previously used horn antennas and waveguides were more bulky and did not have good spatial resolution.

The length of the antennas 36, 38, 62, 64 are approximately one half of the wavelength of the microwave signal used. With reference again to FIGS. 2 and 3, the distance between antennas 38, 64 and the barcodes 32, 52 are typically less than one wavelength. Because multiple frequencies will typically be used, the length of the antenna will be a compromise. The length of the transmitting antennas 36, 62 and receiving antennas 38, 64 need not be the same, and good performance over the range of frequencies is achieved by tuning one antenna of a pair at one end of the frequency range and the other antenna at the other end of the frequency range used.

Figure 4:
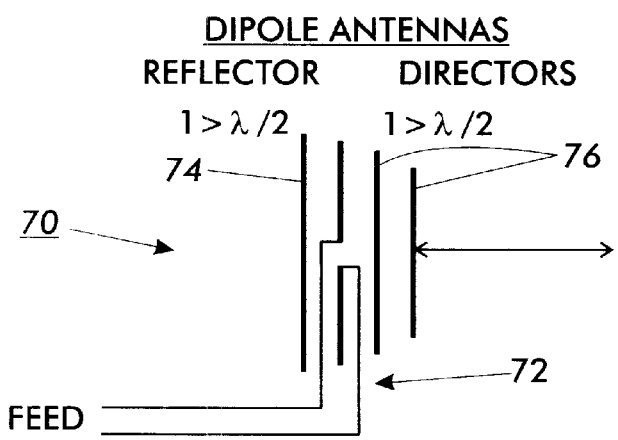
FIG. 4 shows a Yagi antenna.

As shown in FIG. 4, it is possible to improve on the directionality of the antennas by using a Yagi dipole antenna structure 70, which includes a dipole antenna 72, a one-half or greater wavelength reflector 74 and director 76 elements.

Adding these elements reduces the bandwidth of the antennas, and this should be considered in the design.

Figure 5:
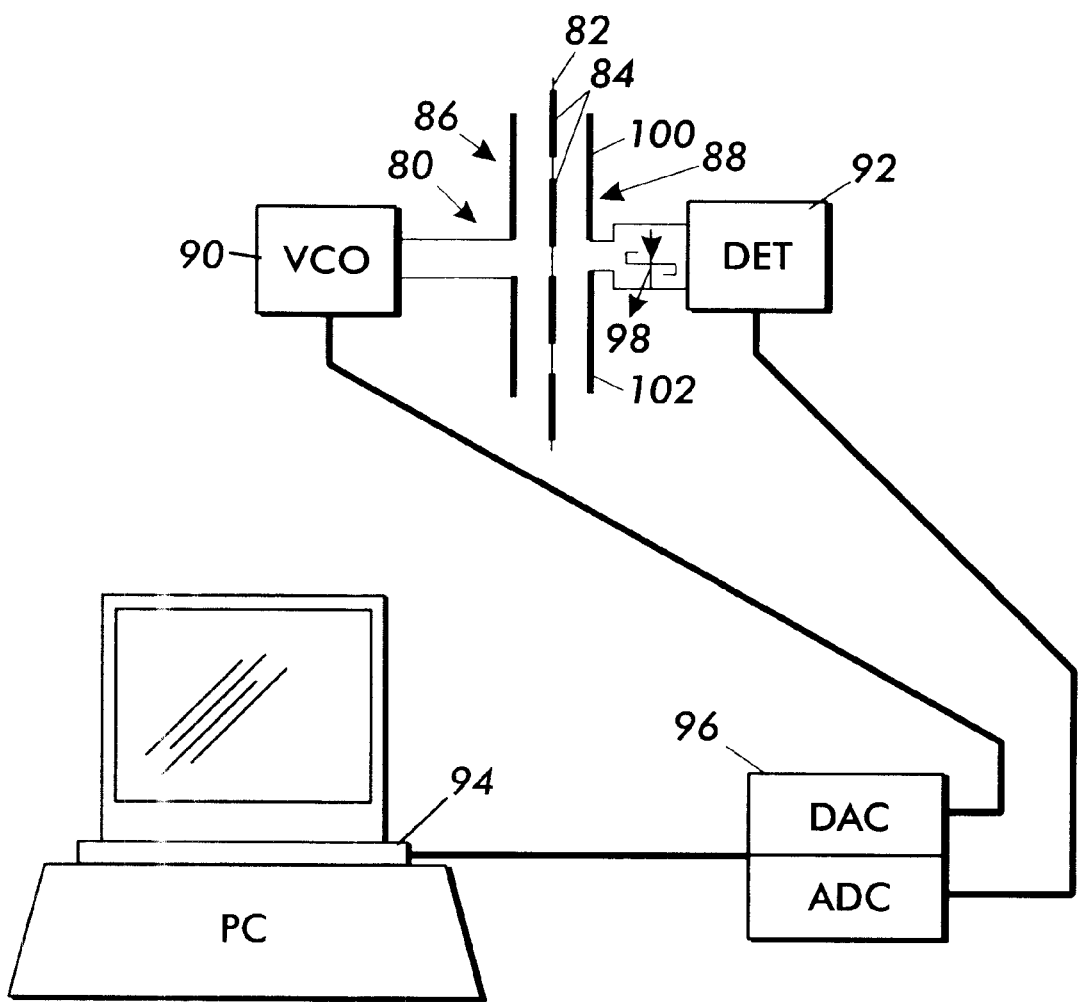
FIG. 5 diagrams a system which may read stand-up and lay-down configurations of a microwave barcode reader.

Readers for both stand-up and lay-down barcodes have been constructed and tested. With reference to FIG. 5, a barcode system 80 was tested using a 4-wire barcode 82. While microwave frequencies of interest range from 1 gigahertz to 200 gigahertz, the microwave frequency range used in the test was 10 gigahertz to 18 gigahertz. The wires 84 used had a length in the range of 0.3" to 0.5" and were placed at a distance of 0.5" from each other. The antennas 86, 88 were placed about 0.5" from each other, and the barcode 82 was placed in the center of the two antennas 86, 88. The transmitter 90 used a voltage controlled oscillator (VCO), and the receiver/detector 92 was a broadband Schottky detector. The detector 92 and VCO 90 were interfaced to a PC 94 using an ADC/DAC interface card 96. Use of the lay-down barcode 82 gave the best results in terms of ability to read the barcode and error rates. An advantage provided by using a dipole antenna as the receiving antenna 88 is that a Schottkyo diode 98 can be placed directly on the antenna 88, bridging receiving elements 100, 102 of antenna 88, thus providing signal detection before any losses are encountered in connecting cables.

Figure 6:
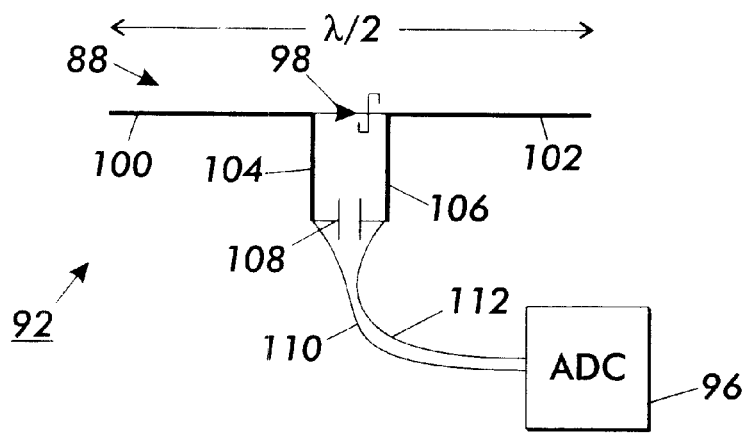
FIG. 6 is a more detailed view of the receiver/detector portion of FIG. 5.

With further attention to FIG. 6, detector 92 of FIG. 5 is shown in more detail. Detector 92 includes dipole antenna 88 including receiving elements 100 and 102. The total length of antenna 88 is one half the microwave radiation wavelength. Schottky diode 98 is connected directly between and in series with receiving elements 100 and 102. The leads of Schottky diode 98 comprise part of the length of the receiving elements 100, 102. A one-quarter wavelength resonator 104 is connected to one lead of Schottky diode 98 in a position perpendicular to receiving element 100. Another one-quarter wavelength resonator 106 is connected to the remaining lead of the Schottky diode in a position perpendicular to receiving element 102. A capacitor 108 is connected between the remaining ends of quarter wavelength resonators 104 and 106. The two leads of capacitor 108 are connected through a pair of wires 110, 112 to the analog digital converter 96.

The arrangement illustrated in FIG. 6 comprises a very small and inexpensive detector. In fact, for the wavelengths used between 12 and 18 gigahertz, the total length of the receiving elements 100, 102 is less than one centimeter. An advantage of detector 92 is that the detector is located at the receiving elements and there are no signal losses before signal detection. The spatial resolution is limited primarily by the wavelength of the microwave radiation. For example, at 15 gigahertz, one half of the wavelength is approximately one centimeter, which is the length of the receiving elements 100, 102.

Figure 7:
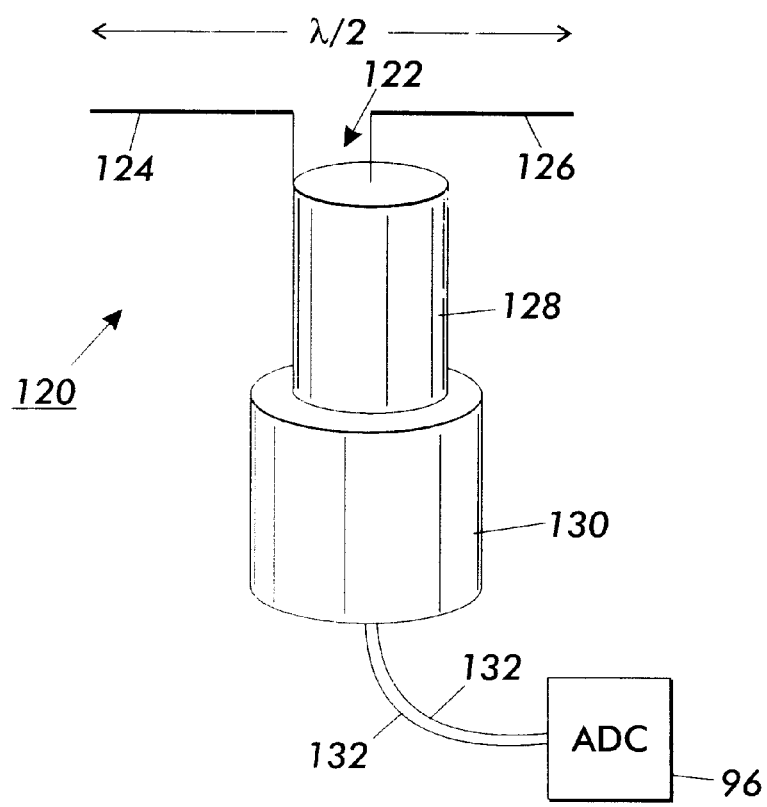
FIG. 7 is another embodiment of a receiver/detector which may be implemented in the circuit of FIG. 5.

Turning to FIG. 7 another antenna configuration is shown. The detector 120 includes a dipole antenna 122 with receiving elements 124 and 126. The total length of antenna 122 is one half of the microwave radiation wavelength. Antenna 122 is connected to a coaxial cable 128 which is in turn connected to a Schottky diode detector 130. The Schottky diode detector 130 in turn is connected by a pair of wires 132 to analog digital converter 96. Connecting dipole antenna 122 to the detector diode 130 through a length of coaxial cable contributes to signal loss and also makes for a more bulky apparatus than the embodiment shown in FIG. 6.

An advantage of a microwave barcode reader using a dipole antenna is the insensitivity to dirt or ink present on the document. It is also possible to read microwave barcodes on documents placed inside envelopes, thus providing a simple means for determining that the document contained in the envelope belongs to the same person or persons addressed on the face of the envelope before mailing the document-containing envelope.

Another advantage offered by the present invention is embedding microwave barcodes within a material of which a document is comprised, paper currency for example. The barcode is invisible to persons handling the currency but could be easily detected by a simple and compact microwave barcode reader using dipole antennas.

It should be appreciated that, while the microwave barcode has been described using wires to make the barcode, other methods of producing the barcode would produce essentially the same results. For example, a conductive ink can replace the wires provided that the conductivity of the ink is sufficient to produce adequate attenuation due to resonance. Metallic foils could also be used in place of wires.

It should also be appreciated that, while stand-up and lay-down barcode schemes have been described, other schemes can also be used with the present invention. For example, another way of encoding information is to use wires of equal lengths, mounted at one angle to represent one datum value and mounted at another angle to represent another datum value. A plurality of angles could be used. The varying absorption of the microwave signal by the equal-length wires at different angles, because of the polarization of the microwave signal, would make it possible to determine the angle of each wire.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, I hereby claim:

1. A microwave barcode system comprising:
    a barcode comprising a plurality of conductive wires mounted on at least one of a surface of an object and below a surface of the object;
    a transmitter radiating microwave signals in the direction of the object; and,
    a microwave reader, including a dipole antenna, positioned to receive the microwave signals passing through the surface of the object wherein the reader senses an attenuation of the microwave signal caused by a resonant interaction between the microwave signals and the conductive wires.

2. The microwave barcode system of claim 1, wherein the plurality of conductive wires is comprised of a plurality of lengths, and each unique length corresponds to a unique datum value.

3. The microwave barcode system of claim 2, wherein the conductive wires are mounted in a stand-up fashion, and each wire is mounted adjacent to and parallel to, but not touching, its at least one neighbor.

4. The microwave barcode system of claim 2, wherein the conductive wires are mounted in a lay-down fashion, each wire is mounted coincident with an imaginary line which is also coincident with the remaining wires, and the wires are mounted end-to-end with a gap surrounding each wire end.

5. The microwave barcode system of claim 2, wherein the barcode comprises:
    a stand-up barcode, wherein each wire is mounted adjacent to and parallel to, but not touching, its at least one neighbor; and,
    and a lay-down barcode, wherein each wire is mounted coincident with an imaginary line which is also coincident with the remaining wires, and the wires are mounted end-to-end with a gap surrounding each wire end.

6. The microwave barcode system of claim 1, wherein the plurality of conductive wires is comprised of equal length wires, each wire is mounted at an angle selected from a plurality of angles, and each unique angle corresponds to a unique datum value.

7. The microwave barcode system of claim 1, wherein the transmitter is comprised of a dipole antenna.

8. The microwave barcode system of claim 1, wherein the dipole antenna includes:
    two conductive receiving elements; and,
    a detector diode connected to bridge the receiving elements.

9. The microwave barcode system of claim 1, wherein the barcode is at least one of a stand-up barcode and a lay-down barcode.

10. The microwave barcode system of claim 9, wherein the stand-up barcode and the lay-down barcode are mounted on the same object, at substantially the same physical location.

11. A microwave barcode system comprising:
    a barcode comprising a plurality of conductive elements mounted on at least one of a surface of an object and below a surface of the object;
    a transmitter, comprising an antenna, radiating microwave signals in the direction of the surface; and,
    a microwave reader, comprising an antenna, positioned to receive the microwave signals passing through the surface wherein the reader senses an attenuation of the microwave signal caused by a resonant interaction between the microwave signals and the conductive wires.

12. The microwave barcode system of claim 11, wherein the microwave reader further comprises:
    two conductive receiving elements; and,
    a detector diode connected to bridge the receiving elements.

13. The microwave barcode system of claim 11, wherein the plurality of conductive wires are comprised of a plurality of lengths wherein each unique length corresponds to a unique datum value.

14. The microwave barcode system of claim 13, wherein the conductive wires are mounted in a stand-up fashion, wherein each wire is mounted adjacent to and parallel to, but not touching, its at least one neighbor.

15. The microwave barcode system of claim 13, wherein the conductive wires are mounted in a lay-down fashion, wherein each wire is mounted coincident with an imaginary line which is also coincident with the remaining wires, and wherein the wires are mounted end-to-end with a gap surrounding each wire end.

16. The microwave barcode system of claim 13, wherein the barcode comprises:
    a stand-up barcode wherein each wire is mounted adjacent to and parallel to, but not touching, its at least one neighbor; and,
    and a lay-down barcode wherein each wire is mounted coincident with an imaginary line which is also coincident with the remaining wires, and wherein the wires are mounted end-to-end with a gap surrounding each wire end.

17. The microwave barcode system of claim 11, wherein the plurality of conductive wires is comprised of equal length wires wherein each wire is mounted at an angle selected from a plurality of angles, and each unique angle corresponds to a unique datum value.

18. The microwave barcode system of claim 11, wherein the surface is an imaginary surface embedded within the object.

19. A method for reading microwave barcodes comprising:
- mounting a barcode comprising a plurality of conductive wires on a surface of an object;
- transmitting, from an antenna, microwave signals in the direction of the surface; and,
- receiving, with an antenna, the microwave signals passing through the surface and sensing an attenuation of the microwave signal caused by a resonant interaction between the microwave signals and the conductive wires.

20. The method of claim 19 wherein the surface is an imaginary surface embedded within the object.

21. The microwave barcode system of claim 11, wherein the microwave signals from the transmitter are polarized microwave signals.

22. The microwave barcode system of claim 11, wherein the antenna of the microwave reader is a Yagi dipole antenna structure including a dipole antenna, a one-half or greater wavelength reflector configuration and a director configuration.

23. The microwave barcode system of claim 11, wherein the transmitter and reader each include a dipole antenna, and the dipole antenna of the transmitter and the dipole antenna of the reader are approximately one-half of the wavelength of the microwave signal, and a distance between the dipole antennas and the barcodes is less than one wavelength.

* * * * *